(12) United States Patent
Oh et al.

(10) Patent No.: US 11,990,280 B2
(45) Date of Patent: May 21, 2024

(54) CAPACITOR COMPONENT HAVING NICKEL AND CARBON BETWEEN INTERNAL ELECTRODE AND DIELECTRIC LAYERS

(71) Applicant: SAMSUNG ELECTRO-MECHANICS CO., LTD., Suwon-si (KR)

(72) Inventors: Young Joon Oh, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 69 days.

(21) Appl. No.: 17/506,047

(22) Filed: Oct. 20, 2021

(65) Prior Publication Data

US 2023/0016258 A1 Jan. 19, 2023

(30) Foreign Application Priority Data

Jul. 7, 2021 (KR) .......................... 10-2021-0089011

(51) Int. Cl.
*H01G 4/008* (2006.01)
*H01G 4/012* (2006.01)
*H01G 4/232* (2006.01)
*H01G 4/248* (2006.01)
*H01G 4/30* (2006.01)

(52) U.S. Cl.
CPC ........... *H01G 4/0085* (2013.01); *H01G 4/012* (2013.01); *H01G 4/232* (2013.01); *H01G 4/248* (2013.01); *H01G 4/30* (2013.01)

(58) Field of Classification Search
CPC ...... H01G 4/0085; H01G 4/012; H01G 4/232; H01G 4/248; H01G 4/30; H01G 4/1227; H01G 4/1209; H01G 13/00
See application file for complete search history.

(56) References Cited

U.S. PATENT DOCUMENTS

| | | | |
|---|---|---|---|
| 2001/0055192 A1* | 12/2001 | Nakano | H01G 4/30 361/306.3 |
| 2005/0121656 A1* | 6/2005 | Choi | H01B 1/24 252/503 |
| 2007/0125195 A1* | 6/2007 | Akimoto | H01G 4/0085 75/252 |
| 2009/0310276 A1* | 12/2009 | Tashima | H01G 4/30 29/25.42 |
| 2011/0141654 A1* | 6/2011 | Okada | H01B 1/02 148/426 |

(Continued)

FOREIGN PATENT DOCUMENTS

JP H11-214242 A 8/1999
JP 2001284161 A * 10/2001
(Continued)

*Primary Examiner* — David M Sinclair
*Assistant Examiner* — Daniel M Dubuisson
(74) *Attorney, Agent, or Firm* — MORGAN, LEWIS & BOCKIUS LLP

(57) ABSTRACT

A capacitor component includes a body, including a dielectric layer and an internal electrode layer, and an external electrode disposed on the body and connected to the internal electrode layer. A region, containing nickel (Ni) and carbon (C), is present between the internal electrode layer and the dielectric layer.

9 Claims, 7 Drawing Sheets

(56) References Cited

U.S. PATENT DOCUMENTS

| | | | |
|---|---|---|---|
| 2013/0250481 A1* | 9/2013 | Sekine | H01G 4/008 |
| | | | 252/514 |
| 2016/0271700 A1* | 9/2016 | Akimoto | B22F 9/04 |
| 2022/0020534 A1* | 1/2022 | Fukuda | H01G 4/12 |

FOREIGN PATENT DOCUMENTS

| JP | 2004111698 A | * | 4/2004 |
| JP | 2014-145117 A | | 8/2014 |
| JP | 2014145117 A | * | 8/2014 |

* cited by examiner

CAPACITOR COMPONENT HAVING NICKEL AND CARBON BETWEEN INTERNAL ELECTRODE AND DIELECTRIC LAYERS

CROSS-REFERENCE TO RELATED APPLICATION(S)

The present application claims the benefit of priority to Korean Patent Application No. 10-2021-0089011, filed on Jul. 7, 2021 in the Korean Intellectual Property Office, the entire disclosure of which is incorporated herein by reference.

TECHNICAL FIELD

The present disclosure relates to a capacitor component and a method of manufacturing the same.

BACKGROUND

A multilayer ceramic capacitor (MLCC), a type of capacitor component, is an important chip component used in industrial areas relating to communications, computing, home appliances, automobiles, and the like, due to advantages thereof such as compactness, guaranteed high capacitance, and desirable mountability characteristics. In particular, an MLCC is a core passive component used in various electric, electronic, and information communications devices such as mobile phones, computers, digital televisions (TVs), and the like.

In general, an MLCC is manufactured by screen-printing a conductive paste for forming an internal electrode layer on a dielectric green sheet, laminating a plurality of dielectric green sheets on which the conductive paste is printed, and sintering the plurality of dielectric green sheets. In general, the conductive paste is prepared by mixing conductive powder particles such as nickel (Ni), ceramic powder particles, a binder, a solvent, and the like, with each other.

In a sintering process for manufacturing an MLCC, carbon of a binder, or the like, included in the conductive paste may react with oxygen to form carbon dioxide. Such carbon dioxide may cause cracking to occur in an interface between a dielectric layer and an internal electrode layer.

SUMMARY

An aspect of the present disclosure is to provide a capacitor component for improving connectivity of an internal electrode layer.

Another aspect of the present disclosure is to provide a capacitor component for increasing capacitance.

Another aspect of the present disclosure is to provide a capacitor component for improving moisture resistance reliability.

According to an aspect of the present disclosure, a capacitor component includes a body, including a dielectric layer and an internal electrode layer, and an external electrode disposed on the body and connected to the internal electrode layer. A region, containing nickel (Ni) and carbon (C), is present between the internal electrode layer and the dielectric layer.

According to an aspect of the present disclosure, a method of manufacturing a capacitor component includes forming a dielectric green sheet and applying a conductive paste, including first powder particles of nickel (Ni) and second powder particles of nickel (Ni) and carbon (C), to the dielectric green sheet. In the conductive paste, the second powder particles are contained in an amount of 0.5 wt % or more to 0.8 wt % or less with respect to a total mass of the first powder particles.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
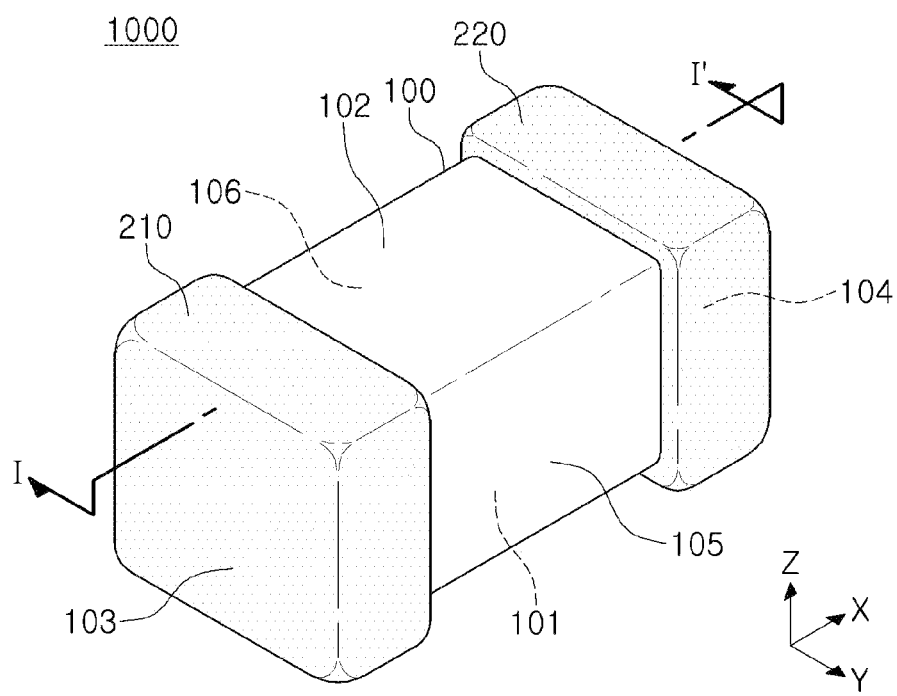
FIG. 1 is a schematic perspective view of a capacitor component according to an exemplary embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a direction of gravity.

Terms such as "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, a first direction may be defined as a T direction or a thickness direction, a second direction may be defined as an L direction or a length direction, and a third direction may be defined as a W direction or a width direction.

Hereinafter, a capacitor component and a method of manufacturing the same according to an exemplary embodiment of the present disclosure will be described in detail with reference to the accompanying drawings. Referring to the accompanying drawings, the same or corresponding components may be denoted by the same reference numerals, and overlapped descriptions will be omitted.

Figure 2:
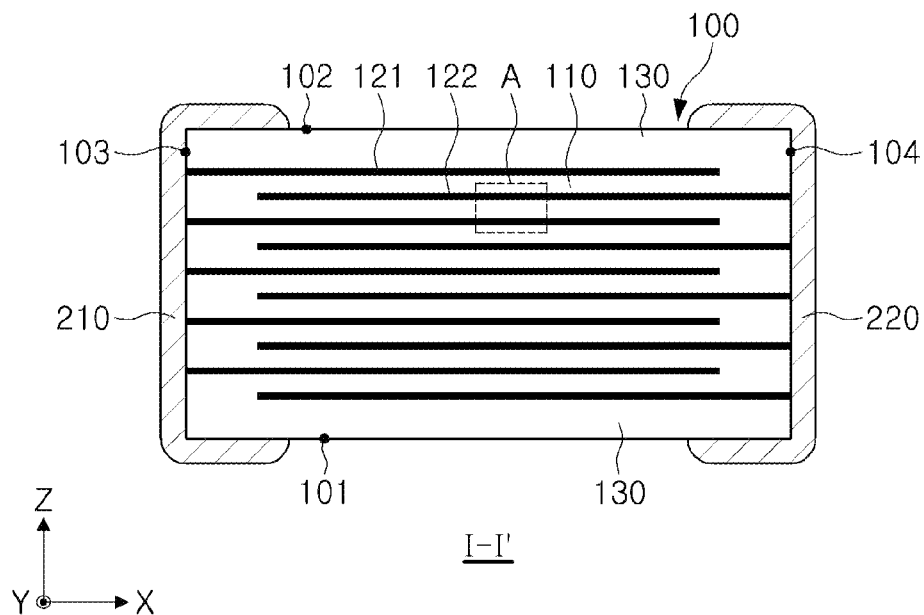
FIG. 2 is a schematic cross-sectional view taken along line I-I' of FIG. 1.
Figure 3:
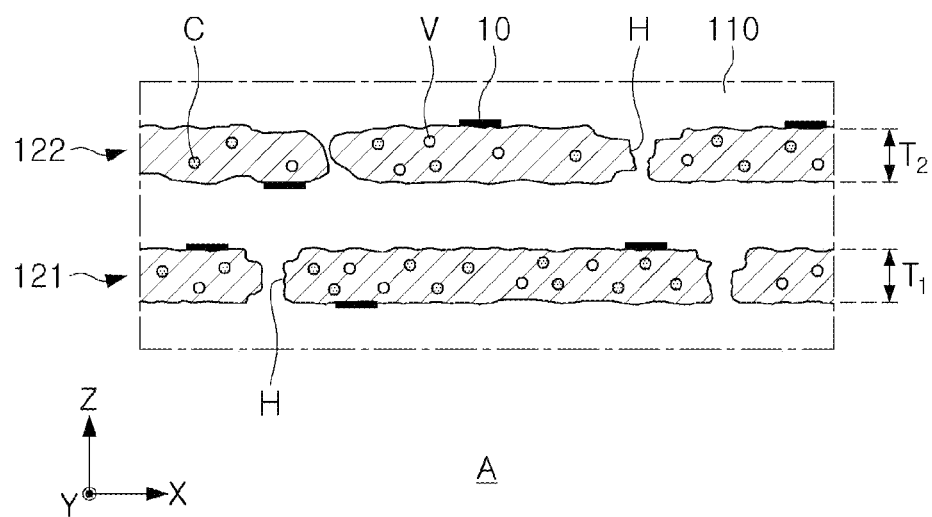
FIG. 3 is an enlarged view of portion "A" of FIG. 2.
Figure 4:
FIGS. 4 to 6 are images, illustrating a portion of a cross-section of a capacitor component according to an exemplary embodiment of the present disclosure, captured by a transmission electron microscope (TEM).
Figure 5:
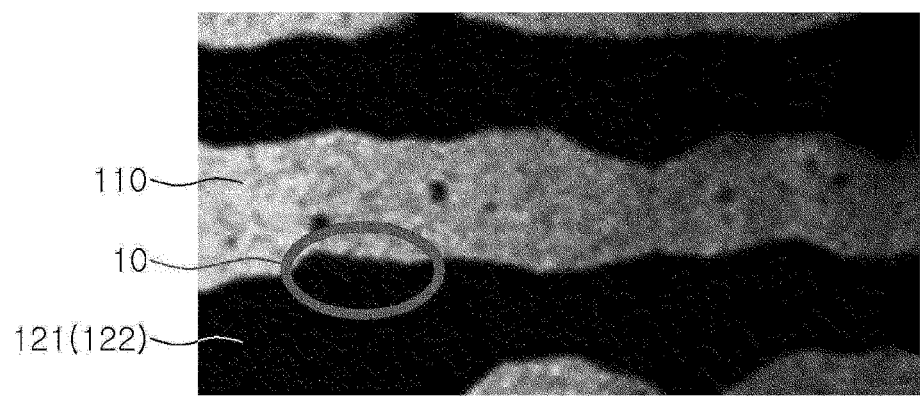
Figure 6:
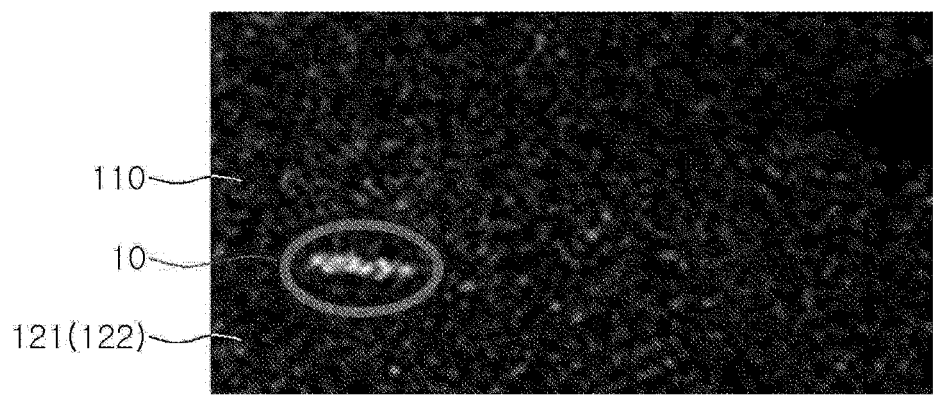
Figure 7:
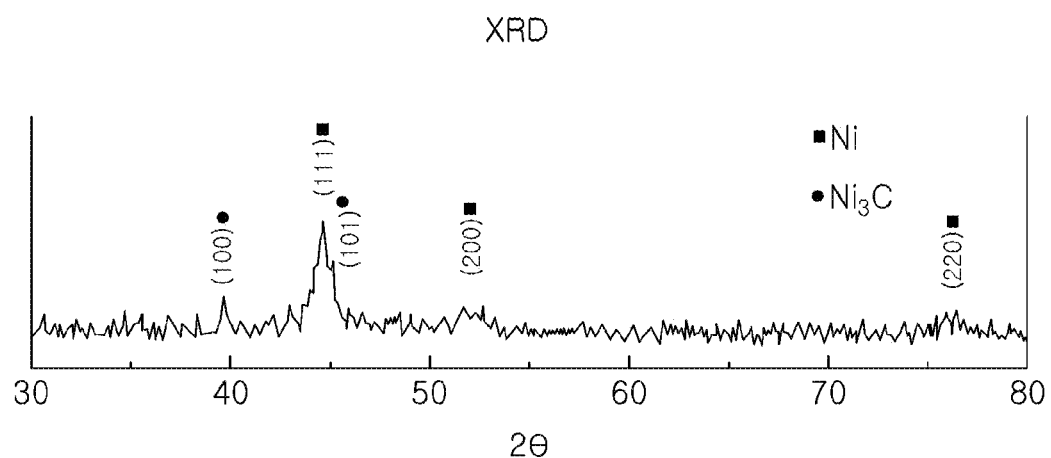
FIG. 7 is a view illustrating an XRD analysis result of a sample for one region of a capacitor component according to an exemplary embodiment of the present disclosure.
Figure 8:
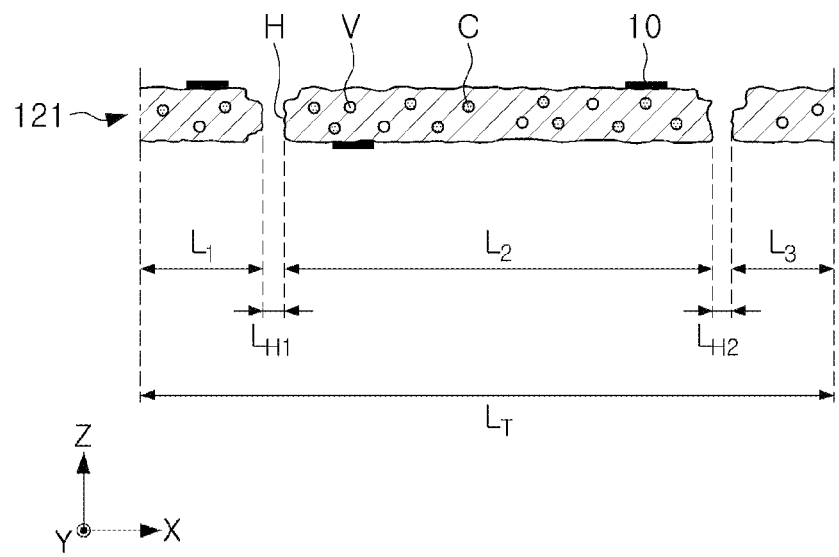
FIG. 8 is a schematic view of a certain internal electrode.

FIG. 1 is a schematic perspective view of a capacitor component according to an exemplary embodiment of the present disclosure. FIG. 2 is a schematic cross-sectional view taken along line I-I' of FIG. 1. FIG. 3 is an enlarged view of portion "A" of FIG. 2. FIGS. 4 to 6 are images, illustrating a portion of a cross-section of a capacitor component according to an exemplary embodiment of the present disclosure, captured by a transmission electron microscope (TEM). FIG. 7 is a view illustrating an XRD analysis result of a sample for one region of a capacitor component according to an exemplary embodiment of the present disclosure. FIG. 8 is a schematic view of a certain internal electrode.

Referring to FIGS. 1 to 8, a capacitor component 1000 according to the present embodiment may include a body 100 and external electrodes 210 and 220. The body 100 may include a dielectric layer 110 and internal electrode layers 121 and 122. A region, containing nickel (Ni) and carbon (C), maybe present between the internal electrode layers 121 and 122 and the dielectric layer 110.

The body 100 may form an exterior of the capacitor component 1000 according to the present embodiment. A shape of the body 100 is not limited to any particular shape, but as illustrated in the drawings, the body 100 may have a hexahedral shape or a shape similar thereto. Due to shrinkage of ceramic powder particles contained in the body 100 during a sintering process, the body 100 may not have a hexahedron shape having completely straight lines but may have a substantially hexahedron shape.

The body 100 may have a first surface 101 and a second surface 102 opposing each other in a thickness direction Z, a third surface 103 and a fourth surface 104 opposing each other in a length direction X, and a fifth surface 105 and a sixth surface 106 opposing each other in a width direction Y, based on FIGS. 1 and 2. Each of the third to sixth surfaces 103, 104, 105, and 106 of the body 100 may correspond to a wall surface of the body 100 connecting the first surface 101 and the second surface 102 of the body 100 to each other. Hereinafter, both end surfaces (one end surface and the other end surface) of the body 100 may refer to the third surface 103 and the fourth surface 104 of the body 110, respectively, and both side surfaces (one side surface and the other side surface) of the body 100 may refer to the fifth surface 105 and the sixth surface 106 of the body 100, respectively. In addition, one surface and the other surface of the body 100 may refer to the first surface 101 and the second surface 102 of the body 100, respectively. One surface of the body 100 may be used as a mounting surface when the capacitor component 1000 according to the present embodiment is mounted on a mounting board such as a printed circuit board (PCB).

The body 100 may include a dielectric layer 110 and first and second internal electrode layers 121 and 122 alternately disposed with the dielectric layer 110 interposed therebetween. Each of the dielectric layer 110, the first internal electrode layer 121, and the second internal electrode layer 122 may be provided as a plurality of layers. Hereinafter, the first and second internal electrode layers 121 and 122 will be collectively referred to as internal electrode layers 121 and 122, except for the case in which they are required to be distinguished from each other. Accordingly, the description of portions collectively referred to as the internal electrode layers 121 and 122 maybe commonly applied to the first and second internal electrode layers 121 and 122.

A plurality of dielectric layers 110 forming the body 100 are in a sintered state and may be integrated, such that boundaries therebetween may not be readily apparent without using a scanning electron microscope (SEM).

A material forming the dielectric layers 110 is not limited as long as sufficient capacitance may be obtained therewith and may be, for example, barium titanate ($BaTiO_3$) powder. The material forming the dielectric layers 110 may include various additives, organic solvents, plasticizers, binders, dispersants, and the like, added to the $BaTiO_3$ powder, or the like, according to the purpose of the present disclosure.

A cover layer 130 may be disposed on upper and lower portions of the body 100, for example, both end portions of the body 100 in the thickness direction (the Z direction). The cover layer 130 may serve to maintain reliability of the capacitor component against external impacts. The cover layer 130 may be formed using a material for forming the dielectric layer 110, or a material different from the material for forming the dielectric layer 110. For example, in the latter case, the material for forming the dielectric layer 110 and the material for forming the cover layer 130 are different in terms of at least one of a composition, a size, a content, and dispersion degree of ceramic particles in the material, or at least one of a composition, a size, a content, and dispersion degree of sub-components in the material.

The internal electrode layers 121 and 122 may be disposed alternately with the dielectric layer 110, and may include first and second internal electrode layers 121 and 122. The first and second internal electrode layers 121 and 122 may be alternately disposed to face each other with the respective dielectric layer 110 interposed therebetween, and may be exposed to (or be in contact with or extend from) the third and fourth surfaces 103 and 104 of the body 100, respectively.

The internal electrode layers 121 and 122 may have a shape similar to an overall plate shape. In FIGS. 3 and 8, each of the internal electrode layers 121 and 122 is illustrated as including a plurality of internal electrode layers spaced apart from each other. However, this is because each of FIGS. 3 and 8 illustrates a cross-section of the body 100. The internal electrode layers 121 and 122 may be integrated members in which only a hole H to be described later is formed to penetrate through the internal electrode layers 121 and 122.

The internal electrode layers 121 and 122 may be alternately exposed to the third surface 103 and the fourth surface 104, both end surfaces of the body 100 in the length direction X, respectively, to be connected to the first and second external electrodes 210 and 220. For example, the first internal electrode layer 121 may be exposed to the third surface 103 of the body 100 so as to be connected to the first external electrode 210, and may not be exposed to the fourth surface 104 of the body 100 so as not to be connected to the second external electrode 220. The second internal electrode layer 122 may be exposed to the fourth surface 104 of the body 100 so as to be connected to the second external electrode 220, and may not be exposed to the third surface 103 of the body 100 so as not to be connected to the external electrode 210. Accordingly, the first internal electrode layer 121 may be spaced apart from the fourth surface 104 of the body 100 by a predetermined distance, and the second internal electrode layer 122 may be spaced apart from the third surface 103 of the body 100 by a predetermined distance. In this case, the internal electrode layers 121 and 122 may be electrically insulated from each other by the dielectric layer 110 disposed therebetween.

The internal electrode layers 121 and 122 may include, for example, one or more conductive materials, among palladium (Pd), silver (Ag), nickel (Ni), and copper (Cu). As an example, the internal electrode layers 121 and 122 may be formed by laminating a conductive paste, including first powder particles of nickel (Ni), second powder particles including nickel (Ni) and carbon (C), a binder, and a solvent, on a dielectric green sheet and sintering the laminated conductive paste. Accordingly, the internal electrode layers 121 and 122 may include nickel (Ni).

The internal electrode layers 121 and 122 may have thicknesses T1 and T2 of 10 nm or more to 500 nm or less, respectively. When each of the thicknesses T1 and T2 of the internal electrode layers 121 and 122 is less than 10 nm, connectivity of the internal electrode layers 121 and 122 may be deteriorated to decrease capacitance. When each of the thicknesses T1 and T2 of the internal electrode layers 121 and 122 is greater than 500 nm, the dielectric layer 110 may be formed to have a low thickness, based on a component having the same size, so that it maybe difficult to electrically insulate the internal electrodes 121 and 122 from each other.

The thicknesses T1 and T2 of the internal electrode layers 121 and 122 may be measured using an optical image or an SEM image obtained by scanning an X-Z cross-section in which the capacitor component is taken in a central portion in the width direction Y. As an example, the thickness of the internal electrode layers 121 and 122 may refer to a value obtained by selecting one of the internal electrode layers 121 and 122 illustrated in the image, measuring a dimension of the selected internal electrode in the Z direction two or more times, and arithmetically averaging the measured dimensions. The measuring of the dimension two or more times may be performed at regular intervals, but exemplary embodiments are not limited thereto. In addition, the thickness of the internal electrode layers 121 and 122 may refer to a value obtained by calculating a thickness of each of the internal electrode layers 121 and 122, illustrated in the imaged, in the above-described method, and dividing the calculated thickness by the total number of electrode layers 121 and 122.

Voids V and ceramic particles C may be disposed in the internal electrode layers 121 and 122. The voids V and the ceramic particles C are different from holes H to be described later and a non-conductive portion, disposed in the holes H, to be described later, in that they do not penetrate through the internal electrode layers 121 and 122. The ceramic particles C may be formed by ceramic powder particles, such as barium titanate, additionally added to the conductive paste for forming the internal electrode layer. The ceramic particles C may be formed of a barium titanate-based material in the same manner as the dielectric of the dielectric layer 110, but exemplary embodiments are not limited thereto. The voids V may be formed due to diffusion and recrystallization in a sintering process of nickel (Ni) powder particles included in the conductive paste, or may be formed by removing an organic material, such as a solvent, included in the conductive paste during the sintering process.

A hole H may be formed in the internal electrode layers 121 and 122, and a non-conductive portion may be disposed in the hole H. The hole H may be a region in which the internal electrode layers 121 and 122 are disconnected, and may penetrate through the internal electrode layers 121 and 122. The non-conductive portion may be formed in the hole H. When the non-conductive portion includes a ceramic material having a composition similar to that of a dielectric material of the dielectric layer 110 and/or the ceramic particles C in the internal electrode layers 121 and 122, the non-conductive portion may connect two adjacent dielectric layers 110 to each other via one of the internal electrode layers 121 and 122. In this case, the non-conductive portion may improve the reliability of the capacitor component 1000 according to the present embodiment. In FIG. 3, the non-conductive portion formed in the hole H is illustrated as connecting adjacent dielectric layers 110 to each other, but this is only an example. As another example, the non-conductive portion formed in the hole H may be a void.

Referring to FIG. 8, in a cross-section of the body 100 taken in a thickness direction Z, a ratio of a length ($L_1+L_2+L_3$) of the internal electrode layers 121 and 122, except for a non-conductive portion, in a length direction to a total length $L_T$ of the internal electrode layers 121 and 122 in a length direction X may be 0.8 or more. The total length $L_T$ of the internal electrode layers 121 and 122 in the length direction X may refer to a sum total of lengths L1, L2, and L3 of a region, in which connection of the internal electrode layers 121 and 122 is maintained, and lengths $L_{H1}$ and $L_{H2}$ of a region, in which the internal electrode layers 121 and 122 are disconnected, for example, the non-conductive portion. The ratio is related to the above-described connectivity of the internal electrode layers 121 and 122. When the ratio is less than 0.8, the connectivity of the internal electrode layers 121 and 122 may be deteriorated to decrease the capacitance.

The total thicknesses $L_T$ of the internal electrode layers 121 and 122 may be measured using an optical image or an SEM image obtained by scanning an X-Z cross-section in which the capacitor component is taken in a central portion in the width direction Y. As an example, the total thickness $L_T$ of the internal electrode layers 121 and 122 may refer to a value obtained by selecting one of the internal electrode layers 121 and 122 illustrated in the image, measuring a dimension of the selected internal electrode in the Z direction two or more times, and arithmetically averaging the measured dimensions. The measuring of the dimension two or more times may be performed at regular intervals, but exemplary embodiments are not limited thereto. Alternatively, the total thickness $L_T$ of the internal electrode layers 121 and 122 may refer to an average value obtained by calculating a thickness of each of the internal electrodes 121 and 122, illustrated in the imaged, in the above-described method, and dividing the calculated thickness by the total number of electrode layers 121 and 122. The description of the method of measuring the total length $L_T$ of the internal electrode layers 121 and 122 in the X direction may be equally applied to the lengths $L_1$, $L_2$, and $L_3$ of the internal electrode layers 121 and 122, except for the non-conductive portion, in the X direction and the lengths $L_{H1}$ and $L_{H2}$ of the non-conductive portion in the X direction.

A region 10, containing nickel (Ni) and carbon (C), may be present between the internal electrode layers 121 and 122 and the dielectric layer 110. The region 10, containing nickel (Ni) and carbon (C), may include a plurality of regions 10 spaced apart from each other. At least some of the plurality of regions 10 may be disposed to be spaced apart from each other between the internal electrode layers 121 and 122 and the dielectric layer 110.

For example, by a transmission electron microscope (TEM) and a scanning TEM (STEM), a determination may be made as to whether the region 10 containing nickel (Ni) and carbon (C) is present between the internal electrode layers 121 and 122 and the dielectric layer 110. Specifically, as illustrated in FIG. 4, it may be confirmed that when a partial region of a cross-section in a length direction X and a thickness direction Z (an X-Z cross-section) taken in a central portion in a width direction is imaged by the TEM, a region 10 having a contrast different from a contrast of each of the internal electrode layers 121 and 122 and the dielectric layer 110 is present between the internal electrode layers 121 and 122 and the dielectric layer 110 in the TEM image. In addition, as illustrated in FIGS. 5 and 6, it may be confirmed that when scanning for a nickel (Ni) element (FIG. 5) and a scanning for a carbon (C) element (FIG. 6) are performed on a cross-sectional region imaged by the TEM of FIG. 4, the region 10 having different contrast of FIG. 4 contains nickel (Ni) and carbon (C). For example, by the TEM and STEM of FIGS. 4 to 6, a determination may be made as to whether the region 10 containing nickel (Ni) and carbon (C) is present between the internal electrode layers 121 and 122 and the dielectric layer 110.

The region 10 may contain a compound of nickel (Ni) and carbon (C). For example, the region 10 may contain nickel carbide ($Ni_3C$) in which a molar ratio of nickel (Ni) to carbon (C) is 3:1.

For example, by an X-ray diffraction (XRD), a determination may be made as to whether the region 10 contains nickel carbide ($Ni_3C$). Referring to FIGS. 4 to 6, a region 10, present between the internal electrode layers 121 and 122 and the dielectric layer 110 and including nickel (Ni) and carbon (C), maybe specified. After separating the region 10 between the internal electrode layers 121 and 121 and the dielectric layer 110, XRD may be performed using the separated region as a specimen. A result of XRD analysis of the specimen has both a nickel (Ni) peak and a nickel carbide ($Ni_3C$) peak. Accordingly, the region 10 may be determined to contain nickel carbide ($Ni_3C$). The nickel (Ni) peak shown in the XRD analysis result of the specimen may be determined to illustrate that a portion of the internal electrode layers 121 and 122 remain in the specimen during the above-described separation process.

The region 10 has a phase different from a phase of the internal electrode layers 121 and 122 having a nickel (Ni)-based main phase and, for example, a phase of the dielectric layer 110 having a barium titanate ($BaTiO_3$)-based main phase. In this regard, the phase of the region 10 may refer to a secondary phase. In the cross-section, in the region 10, a dimension in the length direction X is larger than a dimension in the thickness direction Z, as illustrated in FIGS. 3 and 4. In this regard, the region 10 may refer to acicular particles. In FIG. 3 and the like, the region 10 is illustrated as being present at an interface between the internal electrode layers 121 and 122 and the dielectric layer 110, but this is only an example. Therefore, the scope of the present disclosure is not limited thereto. For example, at least a portion of at least one of the plurality of regions 10 may be disposed in the internal electrode layers 121 and 122 and/or the dielectric layer 110, unlike that illustrated in FIG. 3.

Conventionally, an internal electrode layer may be formed by printing a conductive paste for forming an internal electrode on a dielectric green sheet, laminating and cutting a plurality of green sheets to manufacture a multilayer body, a green chip, and sintering the multilayer body. In general, a conductive paste and a dielectric green sheet for forming an internal electrode layer include not only metal powder particles such as nickel (Ni) and dielectric ceramic powder particles such as barium titanate, but also organic materials such as a dispersant, a binder, and a solvent. In a heat treatment process such as a sintering process, carbon (C) components such as a dispersant, a binder, and a solvent contained in the conductive paste for forming the internal electrode layer and the dielectric green sheet may react with oxygen in a sintering atmosphere to generate carbon dioxide gas. The carbon dioxide gas may be trapped in the boundary between the dielectric layer and the internal electrode layer to cause cracking in the interface between the dielectric layer and the internal electrode layer or to increase a ratio of voids inside the internal electrode layer. Furthermore, a ratio of holes in the internal electrode layer may be increased to deteriorate the connectivity of the internal electrode layers.

To address the above issue, in the capacitor component 1000 according to the present disclosure, not only first powder particles of nickel (Ni) but also second powder particles of nickel carbide ($Ni_3C$) maybe added to a conventional conductive paste for forming an internal electrode layer. For example, the second powder particles of nickel carbide ($Ni_3C$) maybe added to the conductive paste for forming the internal electrode layer to reduce the emission of the carbon (C) components, such as a binder and a solvent, to an external entity in a heat treatment process such as a sintering process. Accordingly, the connectivity of the internal electrode layers 121 and 122 may be improved. As a result, the capacitance of the capacitor component 1000 according to the present embodiment may be increased. For this reason, the moisture resistance reliability of the capacitor component 1000 according to the present embodiment may be improved.

A total mass of the region 10 of nickel carbide ($Ni_3C$) maybe 0.5 wt % or more to 0.8 wt % or less with respect to a total mass of nickel (Ni) of the internal electrode layers 121 and 122. When the ratio is less than 0.5 wt %, the above-described effect may be insignificant. When the ratio is greater than 0.8 wt %, a ratio of the region 10 formed between the internal electrode layers 121 and 122 and the dielectric layer 110 may be excessively increased to reduce mechanical coupling strength between the internal electrode layers 121 and 122 and the dielectric layer 110. On the other hand, when the amount of nickel (Ni), contained in the conductive paste, diffused into the dielectric layer 110 in the heat treatment process such as a sintering process of nickel (Ni) is negligibly small, the ratio, a ratio on a level of the body 100 after the sintering process, may be substantially the same even on a level of the conductive paste for forming an internal electrode layer. For example, in the conductive paste, a total mass of the nickel carbide ($Ni_3C$) powder particles with respect to a total mass of the nickel (Ni) powder particles may be 0.5 wt % or more to 0.8 wt % or less.

The external electrodes 210 and 220 may be disposed on the body 100 and may be connected to the internal electrode layers 121 and 122. As illustrated in FIGS. 1 and 2, the external electrodes 210 and 220 may include first and second external electrodes 210 and 220 disposed on the third and fourth surfaces 103 and 104 of the body 100 to be connected to the first and second internal electrode layers 121 and 122, respectively.

The first and second external electrodes 210 and 220 may include first and second connection portions and first and second extension portions, respectively. The first and second connection portions may be disposed on the third and fourth surfaces 103 and 104 to be connected to the first and second internal electrode layers 121 and 122, respectively. The first and second extension portions may extend from the first and second connection portions to the first surface 101 of the body 100, respectively. The first and second extension portions may be disposed to be spaced apart from each other on the first surface 101 of the body 100. Each of the first and second extension portions may extend not only to the first surface 101 of the body 100, but also to the second, fifth, and sixth surfaces 102, 105 and 106 of the body 100. However, the scope of the present disclosure is not limited thereto. For example, as illustrated in FIG. 1, each of the external electrodes 210 and 220 may be of a normal-type electrode formed on five surfaces of the body 100, but exemplary embodiments are not limited thereto. Each of the external electrodes 210 and 220 may be an L-type electrode formed on two surfaces of the body 100, a C-type electrode formed on three surfaces of the body 100, or the like.

The external electrodes 210 and 220 may be formed of any material, as long as it has electrical conductivity, such as metal, and a specific material may be determined in consideration of electrical characteristics and structural stability. Furthermore, each of the external electrodes 210 and 220 may have a multilayer structure. For example, each of the external electrodes 210 and 220 may include a first layer and a second layer. The first layer maybe formed by sintering a sintered conductive paste including a conductive metal and glass or curing a curable conductive paste including a conductive metal and a base resin, or may be formed by vapor deposition. The second layer maybe a nickel (Ni) plating layer and a tin (Sn) plating layer sequentially formed on the first layer by a plating method.

In the present embodiment, a structure in which the capacitor component 100 has two external electrodes 210 and 220 has been described, but the number or shape of the external electrodes 210 and 220 may vary depending on the shape of the internal electrode layers 121 and 122 or the purposes.

EXPERIMENTAL EXAMPLES

An unsintered green body was fabricated using a conductive paste for forming an internal electrode layer, not containing nickel carbide ($Ni_3C$), and an unsintered green body was formed using a conductive paste for forming an internal electrode to which 0.5 wt % of nickel carbide ($Ni_3C$) powder particles was added, as compared with nickel (Ni) powder particles. The unsintered green bodies were sintered to form a body. The former case was referred to as Experimental Example 1, and the latter case was referred to as Experimental Example 2.

In Experimental Examples 1 and 2, the other conditions were the same, except for only a condition concerning whether a conductive paste for forming an internal electrode layer contains nickel carbide powder particles. For example, the other conditions included i) a composition of a dielectric green sheet, ii) a composition and a content of ceramic powder particles included in the conductive paste for forming an internal electrode layer, iii) a size of a green body (L*W*T), iv) temperature-rising condition and sintering conditions such as a sintering atmosphere, and the like, v) the total number of dielectric layers, vi) the total number of internal electrode layers, vii) an average thickness of the internal electrode layer, viii) an average thickness of the dielectric layer, and ix) a composition and formation conditions of the external electrode. For example, in both Experimental Examples 1 and 2, an average thickness of each internal electrode layer was 480 nm, an average thickness of each dielectric layer was 550 nm, the total number of internal electrode layers was 287, and the size of the green body was L=785 μm, W=440 μm, T=430 μm, which were the same.

Figure 9A:
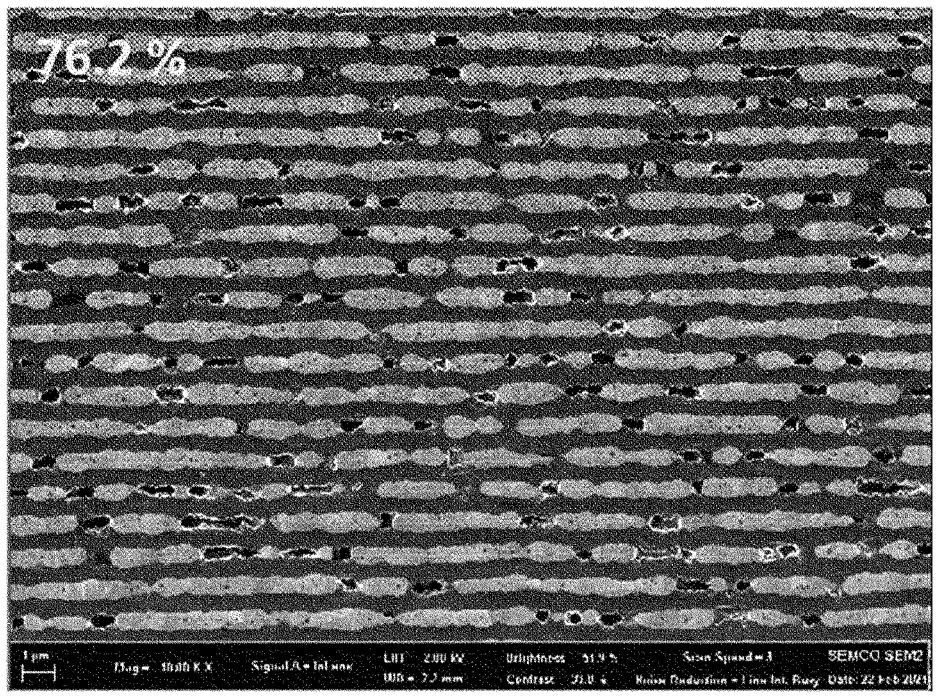
FIG. 9A is a scanning electron microscope (SEM) image illustrating a cross-section of Experimental Example 1.
Figure 9B:
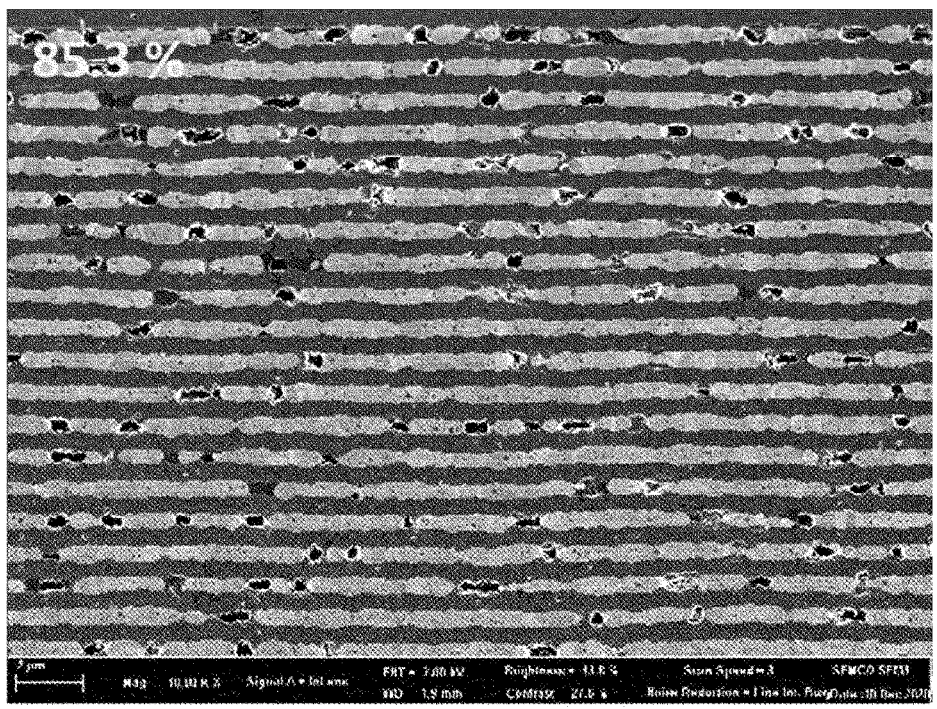
FIG. 9B is a SEM image illustrating a cross-section of Experimental Example 2.

FIG. 9A is an SEM image of a portion of a cross-section, taken from a central portion of a body of Experimental Example 1 in a width direction Y, in a length direction-a thickness direction (an X-Z cross-section), and FIG. 9B is an SEM image of a portion of a cross-section, taken from a central portion of a body of Experimental Example 2 in a width direction Y, in a length direction-a thickness direction (an X-Z cross-section). Connectivity of internal electrode layers in Experimental Examples 1 and 2 were calculated using the SEM images. In Experimental Example 1, the connectivity of the internal electrode layers was 76.2%, and in Experimental Example 2, the connectivity of the internal electrode layers was 85.3%. As a result, it can be seen that the connectivity of the internal electrode layers of Experimental Example 2 using the conductive paste for forming an internal electrode layer containing nickel carbide ($Ni_3C$) was improved by about 12%, as compared with Experimental Example 1 ((85.3−86.2)/76.2*100=11.90). This is considered to be because nickel carbide ($Ni_3C$) absorbed carbon (C) during a sintering process to decrease the amount of carbon emission, so that cracking of the internal electrode layer and damage to the internal electrode layer were reduced.

Table 1 illustrates capacitances (unit: nF) of Experimental Examples 1 and 2, depending on sintering formation of bodies of Experimental Examples 1 and 2 while varying a sintering temperature T. In Table 1, the sintering temperature T may refer to a highest temperature in a sintering process.

As can be seen in Table 1, in Experimental Example 2 formed using a conductive paste additionally containing nickel carbide ($Ni_3C$), the capacitance is improved, as compared with Experimental Example 1 formed by a sintering process at the same sintering temperature. This is because, as illustrated in FIGS. 9A and 9B, the connectivity of the internal electrode layer in Experimental Example 2 is improved, as compared with Experimental Example 1.

TABLE 1

| T | #1 | #2 |
| --- | --- | --- |
| 1130° C. | 3.81 | 3.98 |
| 1135° C. | 3.94 | 4.12 |
| 1140° C. | 3.89 | 4.03 |

Figure 10A:
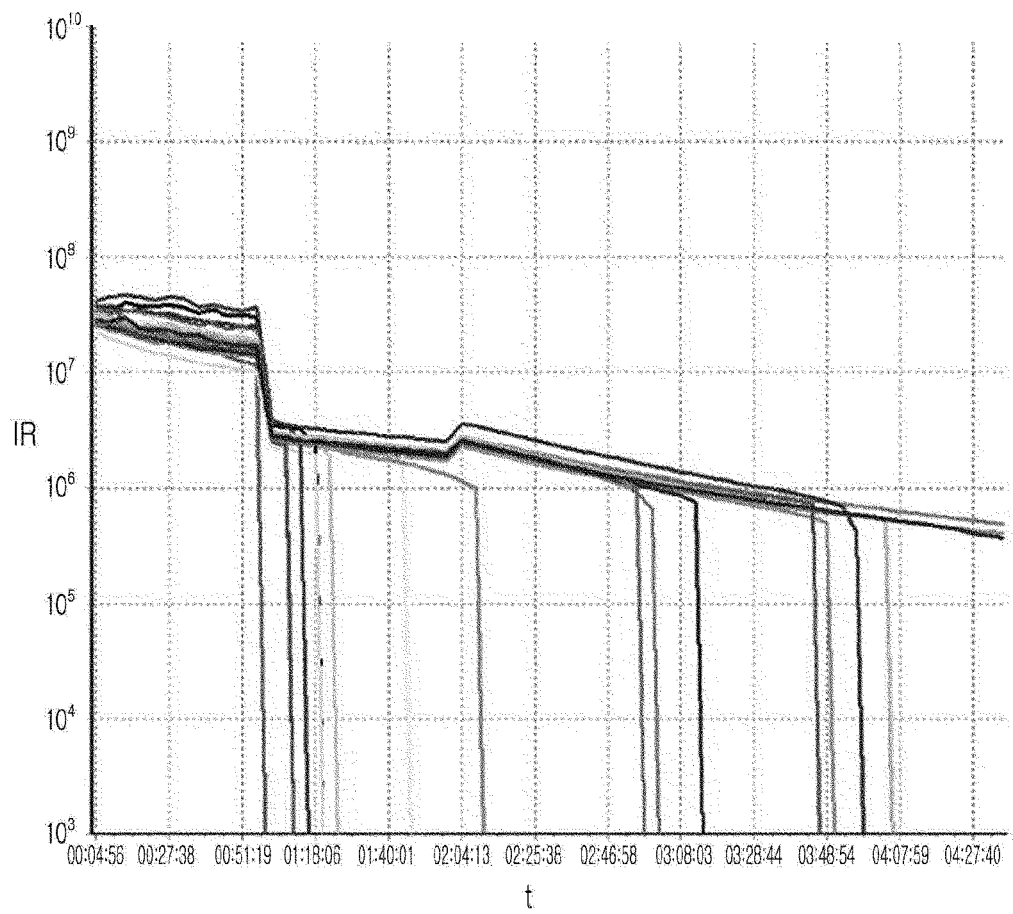
FIG. 10A is a view illustrating an evaluation result of moisture resistance reliability of Experimental Example 1.
Figure 10B:
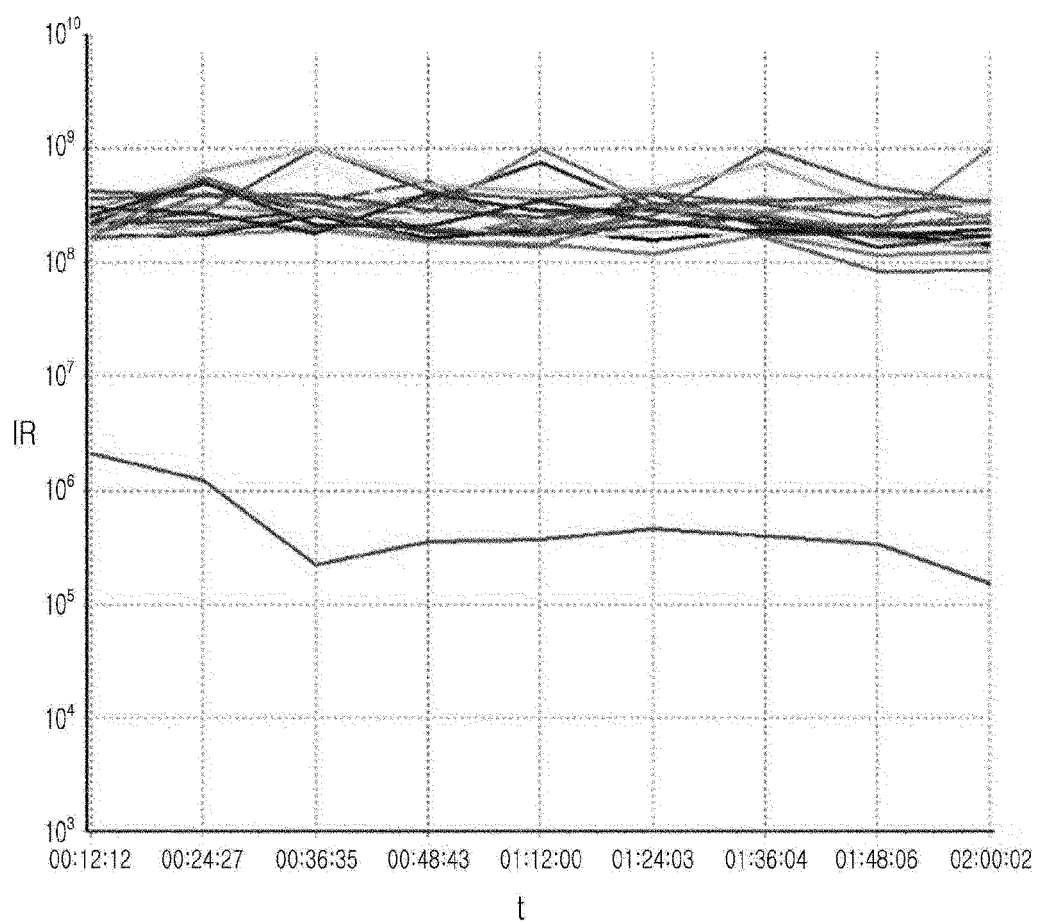
FIG. 10B is a view illustrating an evaluation result of moisture resistance reliability of Experimental Example 2.

FIGS. 10A and 10B illustrate evaluation results of moisture resistance reliability for Experimental Examples 1 and 2, respectively. The moisture resistance reliability was evaluated by measuring a change in insulation resistance "IR" depending on time "t" under test conditions of a temperature of 85° C., a relative humidity of 85%, and an applied voltage of 8V for 20 samples per each experimental example. In the case of Experimental Example 1 illustrated in FIG. 10A, insulation resistances of a total of five samples were rapidly decreased after 1 hour and 30 minutes, but in the case of Experimental Example 2 illustrated in FIG. 10B, a rapid change in insulation resistances of all samples during the same period of time was not observed. As illustrated in FIGS. 9A and 9B, this is considered to be because the connectivity of the internal electrode layers was improved in Experimental Example 2, as compared with Experimental Example 1. On the other hand, a rapid change in insulation resistance of a sample may mean that insulation resistance was decreased by 2% or more, as compared with initial insulation resistance. For reference, in a mass production process, when there are 1/10 or more chips of which insulation resistance is decreased by 2 orders or more (102 or more) as compared with initial insulation resistance, it may be determined to be a "FAIL."

As described above, a capacitor component according to an aspect of the present disclosure may improve connectivity of an internal electrode layer.

A capacitor component according to another aspect of the present disclosure may increase capacitance.

A capacitor component according to another aspect of the present disclosure may improve moisture resistance reliability.

While exemplary embodiments have been shown and described above, it will be apparent to those skilled in the art that modifications and variations could be made without departing from the scope of the present disclosure as defined by the appended claims.

What is claimed is:

1. A capacitor component comprising:
a body including a dielectric layer and an internal electrode layer; and
an external electrode disposed on the body and connected to the internal electrode layer,
wherein a region, containing nickel (Ni) and carbon (C), is present between the internal electrode layer and a portion of the dielectric layer adjacent to the internal electrode layer.

2. The capacitor component of claim 1, wherein the region contains a compound of nickel (Ni) and carbon (C).

3. The capacitor component of claim 2, wherein in the compound of the region, a molar ratio of nickel (Ni) and carbon (C) is 3:1.

4. The capacitor component of claim 2, wherein the region is provided as a plurality of regions disposed to be spaced apart from each other between the internal electrode layer and the dielectric layer.

5. The capacitor component of claim 4, wherein the internal electrode layer includes nickel (Ni), and
a total mass of the compound of nickel (Ni) and carbon (C) of the plurality of regions is 0.5 wt % or more to 0.8 wt % or less with respect to a total mass of nickel (Ni) of the internal electrode layer.

6. The capacitor component of claim 1, wherein a non-conductive portion is disposed in the internal electrode layer to penetrate through the internal electrode layer, and
in a cross-section of the body in a first direction, a ratio of a length of the internal electrode layer, except for the non-conductive portion, in a second direction, perpendicular to the first direction, to a total length of the internal electrode layer in the second direction is 0.8 or more.

7. The capacitor component of claim 1, wherein the region includes nickel carbide ($Ni_3C$).

8. The capacitor component of claim 1, wherein the region is disposed on an outermost surface of the internal electrode layer.

9. The capacitor component of claim 1, wherein an average thickness of the internal electrode layer is 500 nm or less.

* * * * *